United States Patent
Truelson et al.

(10) Patent No.: US 11,250,393 B2
(45) Date of Patent: Feb. 15, 2022

(54) RAPID TRANSACTION SETTLEMENT USING VIRTUAL ACCOUNT

(71) Applicant: Visa International Service Association, San Francisco, CA (US)

(72) Inventors: Chris Truelson, Highlands Ranch, CO (US); Leigh Radtke, Centennial, CO (US)

(73) Assignee: Visa International Service Association, San Francisco, CA (US)

( * ) Notice: Subject to any disclaimer, the term of this patent is extended or adjusted under 35 U.S.C. 154(b) by 339 days.

(21) Appl. No.: 16/186,156

(22) Filed: Nov. 9, 2018

(65) Prior Publication Data

US 2020/0151681 A1 May 14, 2020

(51) Int. Cl.
| | |
|---|---|
| *G06Q 20/00* | (2012.01) |
| *G06Q 20/06* | (2012.01) |
| *G06Q 20/28* | (2012.01) |
| *G06Q 20/36* | (2012.01) |
| *G06Q 20/08* | (2012.01) |

(52) U.S. Cl.
CPC ....... *G06Q 20/0655* (2013.01); *G06Q 20/085* (2013.01); *G06Q 20/28* (2013.01); *G06Q 20/3672* (2013.01)

(58) Field of Classification Search
CPC .......... G06Q 2220/00; G06Q 2220/10; G06Q 2220/16; G06Q 20/0655; G06Q 20/28; G06Q 20/3672; G06Q 20/085; G06Q 20/102; G06Q 20/351
See application file for complete search history.

(56) References Cited

U.S. PATENT DOCUMENTS

| | | |
|---|---|---|
| 8,862,504 B2 | 10/2014 | Sobek |
| 9,786,003 B2 | 10/2017 | Chase et al. |
| 2007/0271160 A1 | 11/2007 | Stone et al. |
| 2009/0112660 A1 | 4/2009 | Mullen et al. |
| 2012/0066131 A1 | 3/2012 | Modi |
| 2013/0218769 A1 | 8/2013 | Pourfallah et al. |

(Continued)

FOREIGN PATENT DOCUMENTS

| | | |
|---|---|---|
| KR | 20130083050 A | 7/2013 |
| KR | 20160141488 A | 12/2016 |

OTHER PUBLICATIONS

International Search Report and Written Opinion, for International Application No. PCT/US2019/060334 dated Apr. 9, 2020, 10 pages.

*Primary Examiner* — Dante Ravetti
(74) *Attorney, Agent, or Firm* — Kilpatrick Townsend & Stockton LLP (57) ABSTRACT

An automation computer can receive a set of instructions pertaining to a transaction. The automation computer can generate a request to generate and activate a virtual account, where the virtual account is associated with a transaction value and a transaction amount. The virtual account can be managed by an authorization computer that can load a transaction value onto the virtual account in an amount equal to the transaction amount. The authorization computer managing both issuer and acquirer functionality in a transaction settlement can settle the transaction rapidly using the loaded virtual account by depositing the transaction value associated with the virtual account directly into an account of a resource provider.

13 Claims, 5 Drawing Sheets

(56) References Cited

U.S. PATENT DOCUMENTS

2013/0275300 A1   10/2013  Killian et al.
2014/0046847 A1    2/2014  Jacobs et al.
2018/0315051 A1*  11/2018  Hurley ............... G06Q 20/4016

* cited by examiner

RAPID TRANSACTION SETTLEMENT USING VIRTUAL ACCOUNT

CROSS-REFERENCE TO RELATED APPLICATIONS

None.

BACKGROUND

Settlement of a transaction typically occurs a significant amount of time after the processing of the initial transaction. For example, a transaction may be processed during a sale or account transfer, but may not settle until sufficient authorizations and verification are performed, which can require substantial portions of time. This is especially true for individual consumers or small-to-medium sized businesses, where settlement of a transaction can require days of time after the initial processing. The length of the time between processing and settlement of a transaction can be caused by the various involved entities to implement the back and forth of conventional time-consuming authorization and verification procedures. Thus, the total time for a transaction to settle after being processed initially can inconvenience the entities involved, such that the transaction funds are received significantly after an initial processing and recordation of the transaction. For example, an entity may purchase goods from a small business, but the small business may not receive the funds of the transaction until days after. The delay in settlement can be problematic.

Various embodiments of the invention address these and other problems, individually and collectively.

BRIEF SUMMARY

Embodiments of the present invention provide for methods, devices, and systems for rapid transaction settlement using a virtual account. According to some embodiments, a method for rapidly settling transactions using a virtual account may include receiving, by an automation computer, a set of instructions. The automation computer may then generate a request to generate and activate a virtual account. The method can further include generating, by the automation computer, an authorization request message for a transaction according to the set of instructions. The automation computer may then transmit the authorization request message to an authorization computer processor via a processing network computer, which can cause the authorization computer processor to generate an authorization response message, which can be received by the automation computer. The processing network computer can cause a transfer of value for the transaction from an issuer module to an acquirer module in the authorization computer associated with the authorization computer processor.

Another embodiment is directed to a system comprising an automation computer and a processing network computer. The automation computer can include a first processor and a first computer-readable medium, where the first computer-readable medium can comprise code executable by the first processor to implement a method. The method implemented by the first processor can include receiving a set of instructions, generating a request to generate and activate a virtual account, generating an authorization request message for a transaction according to the set of instructions, transmitting the authorization request message to an authorization computer processor via a processing network computer that causes the authorization computer processor to generate an authorization response message, and receiving the authorization response message. The processing network computer can be in operative communication with the automation computer. The processing network computer can include a second processor and a second computer-readable medium, where the second computer-readable medium can comprise code executable by the second processor for implementing a method. The method implemented by the second processor can include causing a transfer of value for the transaction from an issuer module to an acquirer module in the authorization computer associated with the authorization computer processor.

An additional embodiment is directed to the automation computer for implementing the method described above.

These and other embodiments of the invention are described in detail below. For example, other embodiments are directed to systems, devices, and computer-readable media associated with methods described herein.

A better understanding of the nature and advantages of embodiments may be gained with reference to the following detailed description and the accompanying drawings.

DETAILED DESCRIPTION

Prior to discussing specific embodiments of the invention, some terms may be described in detail.

A "user" can be a person, a device, or other entity that operates, uses, and/or controls an electronic device. A user may include an individual that may be associated with one or more personal accounts (e.g., virtual accounts), and/or electronic devices.

An "electronic device" may include a device that incorporates one or more electronic components. The one or more electronic components can be in the form of integrated circuits, and may implement one or more functional components such as a processor, memory, or other application specific integrated circuits. Examples of an electronic device may include a communication device, a computing device, a mobile device, etc., or a combination thereof.

A "communication device" may include a device that can be used for communication. The communication device may directly or indirectly communicate with another device or another entity such as an individual or group. A communication device may provide remote or direct communication capabilities. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of communication devices include desktop computers, videogame consoles, mobile phones (e.g., cellular phones), PDAs, tablet computers, net books, laptop computers, personal music players, hand-held specialized readers, etc. Further examples of communication devices include wearable devices, such as smart watches, fitness bands, ankle bracelets, rings, earrings, etc., as well as automobiles with remote or direct communication capabilities. A communication device may comprise any suitable hardware and software for performing such functions, and may also include multiple devices or components (e.g., when a device has remote access to a network by tethering to another device—i.e., using the other device as a modem—both devices taken together may be considered a single communication device). In some examples, a communication device may be referred to as a "user device."

A "computing device" may include a device that includes one or more electronic components for processing data or information. The one or more electronic components may include one or more processors coupled to one or more computer-readable and/or writable memories (e.g., implementing one or more storage devices and/or system memories). A computing device may be used to execute one or more software applications. A computing device may also implement multiple operating environments using hardware, software, firmware, or a combination thereof for running security sensitive applications. Examples of computing devices may include computers, mobile devices, point-of-sale devices, security token devices, etc. Some computing devices such as point-of-sale devices and security token devices are specialized for conducting transactions.

A "mobile device" may include any electronic device that may be transported and operated by a user. The mobile device may provide communication capabilities for remote communication with a network. The mobile device may be configured to transmit and receive messages or communications to and from a server computer and display the messages on a display screen on the mobile device. Examples of mobile devices include mobile phones (e.g. cellular phones), PDAs, tablet computers, net books, laptop computers, personal music players, hand-held specialized readers, etc. In some examples, a mobile device may be referred to as a "user device."

A "resource provider" may be an entity that can provide a resource such as goods, services, information, and/or access. Examples of resource providers includes merchants, data providers, transit agencies, governmental entities, venue and dwelling operators, etc.

A "resource provider computer" may be a computer operated by a resource provider. Suitable computers may include access devices, back end server computers, as well as combinations of the above.

An "access device" may be any suitable device for providing access to an external computer system. An access device may be in any suitable form. Some examples of access devices include point of sale (POS) devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a portable communication device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a portable communication device. The POS terminal may also be referred as a "request processing device". The access device may be include IoT connected device(s).

"Authentication" or "authenticating" may be the process of proving or verifying certain information, and/or verifying the identity of the source of that information. For example, a user may provide authentication data that is unique or only known to the user to prove the identity of the user. Examples of different types of authentication data may include biometrics (e.g., fingerprint, palm print, face recognition, iris and/or retina recognition, voice recognition, gait, or other human characteristics), passcode, PIN, answers to security question(s), cryptographic response to challenge, human and/or device signature, etc.

An "authorizing entity" is an entity which can authorize or approve transactions. An authorizing entity may typically refer to a business entity (e.g., a bank) that maintains an account for a user and is capable of authorizing transactions such as payment transactions, for example the purchase of goods or services.

An "issuing entity" is an entity which can issue a transaction mechanism. For example, an issuing entity can be a business entity (e.g., a bank or credit union) that can issue a payment device (e.g., credit card, debit card, smart card, prepaid device, or contactless device) to an account owner and can provide administrative and management functions for the payment account.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval— transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization.

An "issuer module" may be a module implemented by an issuing entity. For example, an issuer module can include code to implement various functions performed by an issuing entity. In some examples, the issuer module may be a component of an authorization computer operated by an authorizing entity.

An "acquirer module" may be a module implementable by an acquiring entity. For example, an acquirer module can include code to implement various functions performed by an acquiring entity. In some examples, the acquirer module may be a component of an authorization computer operated by an authorizing entity.

A "virtual account" may be an account associated with a user. A virtual account can be a payment account that may be usable for processing a transaction. For example, a virtual account can be an account involving the processing of credit or debit values. In some examples, a virtual account may be a prepaid account, or may be generated for the purposes of storing a prepaid value in preparation of processing future transactions. In some examples, a virtual account can be identified using a virtual account number (e.g., PAN).

An "automation computer" may be a computer useable to automate a process. For example, an automation computer may be a computer that interacts with multiple entities to perform process associated with those entities. Such entities can include a resource provider computer, an authorization computer, and a processing network computer, where the automation computer may act as an intermediary entity to perform processes between each entity. In some examples, an automation computer may be a computer including a processor to implemented functionality associated with VISA Payables Automation (VPA).

A "payment processing network" may be a network used to process transactions. A payment processing network, which may be referred to as a "payment network," is a system that may comprise one or more servers, data processing subsystems, networks, and operations used to support and deliver authorization services, exception file services, and clearing and settlement services. A payment processing network may be able to process one or more of credit card transactions, debit card transactions or any other type of commercial transaction. An exemplary payment processing network may include, for example, VisaNet™.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

Transaction settlement remains a time-consuming process involving multiple entities communicating a series of authorization request messages and authorization response messages. Current transaction settlement times, especially for settlement of transactions with small-to-medium businesses ("SMBs") or other small entities (e.g., individuals), can reach periods of up to days. The length of these transaction settlement times can be attributed to the currently employed payment processing architectures that involve communications across multiple processing networks required for fully settling a transaction (e.g., moving funds corresponding to the transaction from one entity to another entity).

For example, in a conventional payment process, a user may make a purchase online for a product. The service provider selling the product can receive payment information from the user, and then communicate the payment information and transaction amount to an acquirer entity associated with the payment information. The acquirer entity, acting as an intermediary, can send an authorization request message to an authorizing entity via a payment processing network. The authorizing entity can analyze the transaction to determine if the user has sufficient funds to pay for the transaction and if the transaction is authentic. It can then generate and send an authorization response message back to the acquirer entity via the payment processing network.

After the acquirer entity receives the authorization response message, the transaction can be settled using a clearing and settlement process. After settlement, the service provider can receive payment associated with the transaction from the authorizing entity, and the authorizing entity can invoice the user. Th clearing and settlement process can be time-consuming due to the multiple communications between each entity. The time to settle the transaction can prevent the service provider from receiving the funds in a timely manner. Thus, instead of being available for use by the service provider, the funds are tied up until settlement has been finalized, limiting the service provider's fungible assets.

Eliminating the need to communicate messages between multiple entities over multiple networks can greatly reduce transaction settlement time. By reducing the number of entities involved in settling a transaction, transaction settlement can be reduced from days of time to minutes or less. For example, having one entity manage the functions of both the traditional acquirer entity and authorizing entity (e.g., an issuer) can reduce the number of communications required to settle a transaction. By reducing the number of handshaking processes via a simplified payment processing system architecture with fewer involved entities, the number of computational resources devoted to generating and processing clearing and settlement messages can be reduced or repurposed for processing additional transactions. Having a single entity oversee issuing entity and authorizing entity processes can improve the speed of settling a single transaction while simultaneously freeing up computational resources.

Embodiments provide solutions to technical problems. In some embodiments, a number of open solutions readily available in the a developer platform can be combined into a unique system and method for rapidly settling transactions. The system can utilize a payables automation system and a debit processing system to create single-use virtual primary account numbers ("PANs") that can be utilized to automatically pay a registered merchant or supplier using a straight-through processing (STP) system to reduce integration needs from merchants or suppliers. This functionality could be implemented in a variety of environments, such as alternative lending loan disbursements, worker pay disbursements, etc.

In such an embodiment, a single entity such as a payment processor can manage the issuance of a virtual card, payment to the merchant/supplier using the merchant/supplier pre-registered MID ("merchant identifier"), straight-through processing ("STP"), and a merchant processor as the merchant point-of-sale ("POS")/acquirer processor. The payment processor can then improve the velocity of funds for the merchant/supplier by putting a direct load for the funds on a commercial prepaid account for the merchant/supplier. The system, in conjunction with an entity acting as both issuer and acquirer, could also create rapid asset movement so that an acquired transaction is more quickly settled to a merchant/supplier account. For example, using embodiments, a driver for a ride-share service can have a deposit made to your her prepaid account as soon as her passenger exits her car. Because the acquiring and issuing is done within the same ecosystem, the settlement risk for the payment processor as well as any bank associated with the transaction is minimal, allowing for rapid settlement.

Figure 1:
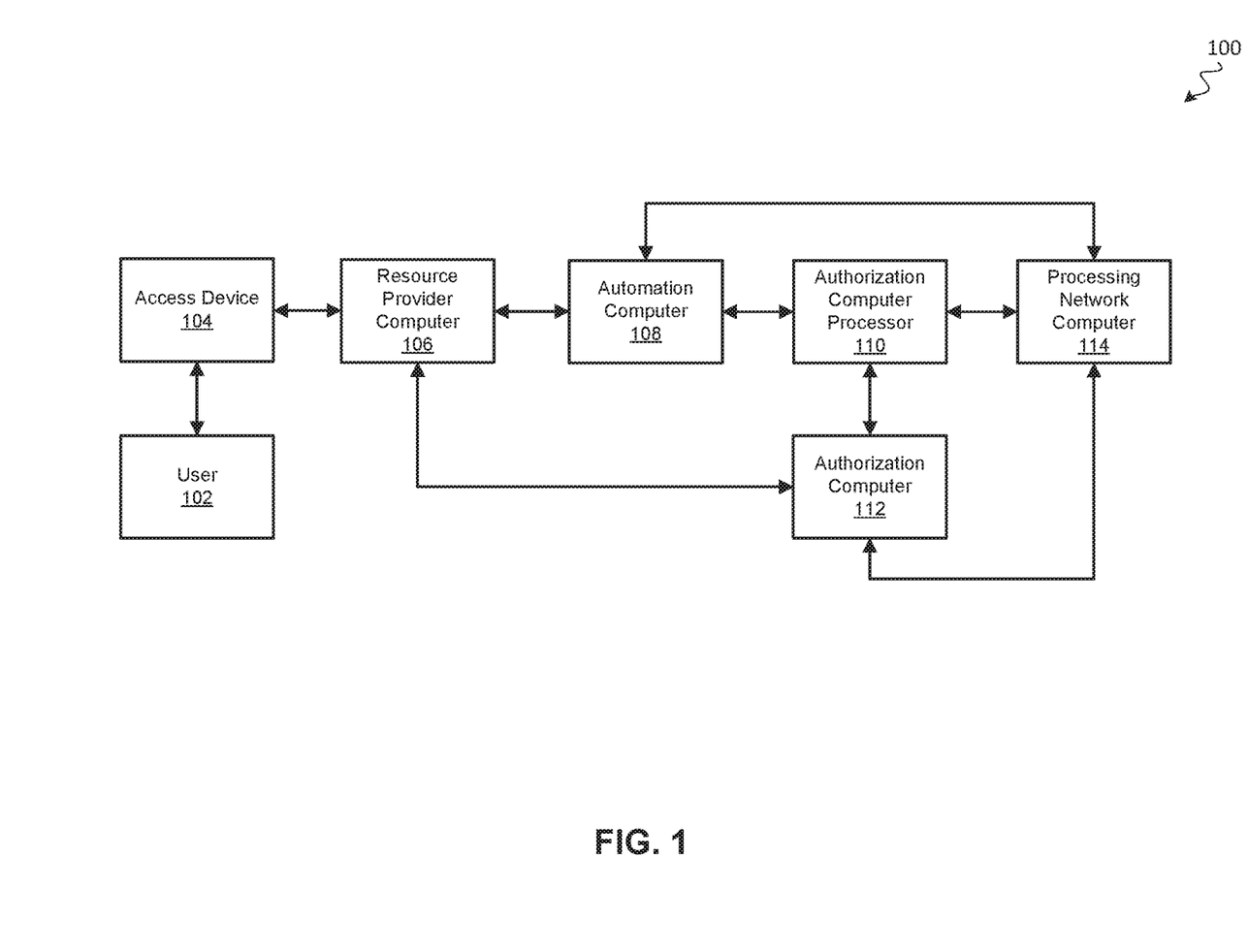
FIG. 1 illustrates a conceptual block diagram of an example of a transaction settlement environment for rapid settlement of transactions using a virtual account, according to some embodiments.

FIG. 1 illustrates a conceptual block diagram of a system 100 for rapid settlement of transactions using a virtual account, according to one embodiment. The system 100 can include a user 102, an access device 104 (e.g., a POS terminal), a resource provider computer 106 (e.g., a merchant computer), an automation computer 108, an authorization computer processor 110 (e.g., an issuer processor computer), an authorization computer 112 (e.g., an issuer computer), and a processing network computer 114 (e.g., a payment processing network computer). Each of these can be in operative communication with each other. It is to be understood that embodiments of the invention may include more than one of the components shown individually in FIG. 1. Additionally, some embodiments of the invention may include fewer than all of the components shown in FIG. 1. The various computers, devices, and processors may be configured to communicate in any suitable manner using any suitable communication network. Although the entities are shown as connected to particular entities, the entities may be configured to communicate through any other suitable interfaces and some entities may be removed and/or added to the system depending on the configuration of the system.

The user 102 can interact with the access device 104 to initiate a transaction. The access device 104 can be a communication device, such as a computing device or a mobile device. In some examples, the user 102 can initiate the transaction with the access device 104 using a mobile device (e.g., mobile phone or a payment card interfacing with a POS terminal).

The access device can be communicatively connected to the resource provider computer 106 to receive information about the user-initiated transaction. In some examples, the access device 104 may be incorporated into the resource provider computer 106. After the access device 104 acknowledges the initiation of a transaction and relays the transaction information to the resource provider computer 106, the resource provider computer 106 may communicate information about the transaction to the automation computer 108 and the authorization computer 112. The automation computer 108 can receive information related to the transaction from the resource provider computer 106. The authorization computer 112 can receive fungible assets from the resource provider computer 106 equal to the transaction amount.

The automation computer 108 can be communicatively coupled to the authorization computer processor 110 for purposes of requesting the generation of a virtual account. In some examples, the authorization computer processor 110 can be a component of the authorization computer 112, such that they are housed in a single device. In some examples, the authorization computer processor 110 can be a separate device communicatively coupled to the authorization computer 112. The authorization computer processor 110 can transmit the virtual account and any associated information to the authorization computer 112. The authorization computer 112 can load a transaction amount, as received from the resource provider computer 106, onto the virtual account created by the authorization computer processor 110 at the request of the automation computer 108. The authorization computer 112 can communicative with the processing network computer 114.

The automation computer 108 may generate an authorization request message for the transaction initiated by the user 102. The data included in the authorization request message (also referred to as an "authorization request") may include data obtained from the user 102 (e.g., payment account holder) as well as other data related to the transaction, the access device 104, or the merchant operating the resource provider computer 106, such as one or more of a payment account numbers, the payment device expiration date, a currency code, the sale amount, a merchant transaction stamp, the acceptor city, the acceptor state/country, etc. As part of generating the authorization request message, automation computer 108 may communicate with a database which stores data such as data regarding the account owner, the payment device, or the account owner's transaction history with the merchant. The automation computer 108 can transmit the authorization request message to the processing network computer 114. The processing network computer 114 can relay the authorization request message to the authorization computer processor 110 to authenticate and authorize the transaction. In response, the authorization computer processor 110 can transmit an authorization response message to the automation computer 108 through the processing network computer 114.

The processing network computer 114 can implement the functions of a payment processing network. In some examples, the functions performed by the processing network computer 114 can be performed by a server computer or a series of computers. Although the system of FIG. 1 only shows one payment processing computer, any number of payment processing computer and associated networks may be implemented in the transaction eco-system to allow for the support and selection of various appropriate payment applications associated with the one or more payment method useable by the user 102.

A conventional clearing and settlement process can be conducted by a payment processing network. A clearing process is a process of exchanging financial details between an acquirer and an issuer to facilitate posting to the payment account holder's account and reconciliation of the consumer's settlement position. In some cases, clearing and settlement can occur simultaneously. In some embodiments, because the authorization computer 112 can perform the functions of both the issuer and the acquirer, the time to perform the clearing process is reduced significantly or eliminated, therefore increasing the speed at which transactions settle.

Figure 2:
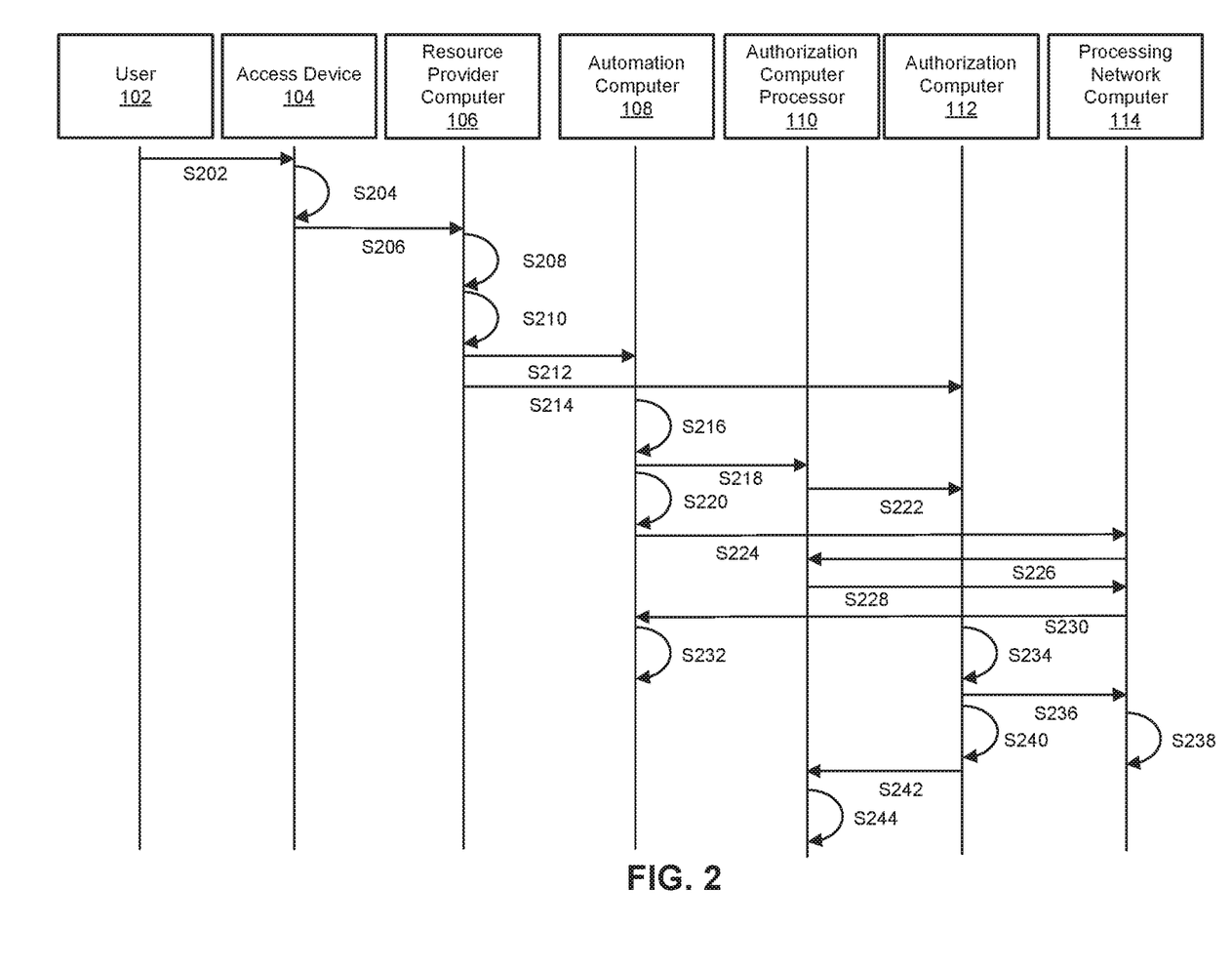
FIG. 2 illustrates a flow diagram of an example of a process for rapid settlement of transactions using a virtual account, according to some embodiments.

FIG. 2 illustrates a flow diagram of an example of a method according to some embodiments. The processes described herein can allow for near-instantaneous settlement of transactions by managing both issuer and acquirer functionality simultaneously via a single entity (e.g., at the authorization computer 112) or at the discretion of a single entity.

At step S202, the user 102 initiates a transaction as described in FIG. 1, and provides transaction information to the access device 104. For example, the user 102 can be shopping online for airfare using a desktop computer. Upon checkout of the transaction, the user 102 can choose between multiple payment methods. Instead of using a credit or debit card, the user 102 can be provided with an option to purchase the airfare using a consumer loan. The consumer loan may be presented to the user 102 via the access device 104 by a lender associated with the resource provider (e.g., a merchant) associated with the resource provider computer 106. In some cases, the resource provider may be the lender. In other embodiments, the lender may be a bank working with the resource provider. The user 102 can select the consumer loan payment option via the access device 104 to initiate finalization of the transaction using the loan payment option provided by the lender.

At step S204, the access device 104 obtains transaction information provided by the user 102. In the airfare purchase example described above, the access device 104 records all information related to the transaction, and obtains input by the user 102 to process the transaction using a consumer loan provided by the lender.

At step S206, the access device 104 sends transaction information to the resource provider computer 106. For example, in response to the user 102 selecting to process the transaction using a consumer loan, the access device 104 can display information related to offerings by directing the user 102 to loan information provided by the lender via the resource provider computer 106. Instead of using a credit card, the user 102 can select a secondary payment option (e.g., a lending portal) that is associated with the lender that has a relationship with the resource provider or merchant/supplier (e.g., airline, airfare purchasing website).

At step S208, the resource provider computer 106 records that the user 102 has selected to complete the transaction using the lender. Continuing the airfare example, the resource provider such as the airline receives a selection for a loan to be used as payment for airfare. The resource provider computer 106 then works with the lender to create a loan in the amount for the transaction.

At step S210, the resource provider computer 106 captures the transaction information provided by the user 102 and the access device 104, and can provide it to the lender. For example, the resource provider computer 106 and the lender can be provided with an order number corresponding to the purchase order of the user 102 for airfare. Thus, the loan payment option selected by the user 102 to process the transaction can be associated with an order number for identification purposes.

At step S212, the automation computer 108 receives a set of instructions from the resource provider computer 106. The set of instructions can be included in a request generated and transmitted by the resource provider computer 106 to instruct the automation computer 108 to issue, activate, load, and transact a virtual account. The set of instructions can include transaction information corresponding to the transaction initiated by the user 102 in step S202. For example, the set of instructions can include the transaction amount, an order number, and any other information required to process the loan payment option selected by the user 102. The automation computer 108 can implement functionality exemplified by a payables automation system for processing the transaction.

At step S214, the resource provider computer 106 or the lender associated with the resource provider computer transmits the value of the transaction amount to the authorization computer 112. For example, the transaction amount for the airfare loan may be $500. The resource provider computer 106 or the lender can transfer funds equal to the transaction amount to the authorization computer 112. Thus, the authorization computer 112 receives fungible assets, not simply a recordation that the amount of the transaction was $500. These funds can be associated with a virtual account for the transaction, and the transaction may be associated with a transaction ID.

At step S216, the automation computer 108 generates a request to generate and activate a virtual account. The request generated by the automation computer 108 can be transmitted to the authorization computer processor 110. For example, the request may include instructions for the authorization computer processor to activate and load a virtual account associated with the transaction initiated by the user 102 for purchase of airfare.

At step S218, the automation computer 108 transmits the request generated in step S216 to the authorization computer processor 110.

At step S220, the automation computer 108 generates an authorization request message for a transaction according to the set of instructions. After receiving the set of instructions according to step S212, the automation computer 108 can generate a request to authorize the transaction initiated by the user 102 in step S202.

At step S222, the authorization computer processor 110 activates and loads the virtual account, then transmits the virtual account (or identifier thereof) to the authorization computer 112. The authorization computer processor 110, upon receiving the request in step S218, can activate and load the virtual account in preparation of managing the virtual account and any related funds as described in step S234. For example, after receiving the request from the automation computer 108, the authorization computer processor 110 can generate and load a virtual account corresponding to the transaction initiated by the user 102. The virtual account can include data corresponding to the transaction amount.

At step S224, the automation computer 108 transmits the authorization request message to the processing network computer 114. After generating the authorization request message according to step S220, the automation computer 108 can transmit the request to begin the process of authorizing the transaction initiated by the user 102 in step S202.

At step S226, the processing network computer 114 transmits the authorization request message to the authorization computer processor 110 for authentication and authorization. The authorization computer processor 110 can authorize and authenticate the transaction based on the received authorization request message. It may do this on behalf of the authorization computer 112. The authorization request message, after being relayed by the processing network computer 114 from the automation computer 108, can cause the authorization computer processor 110 to generate an authorization response message.

At step S228, the authorization computer processor 110 transmits the authorization response message to the processing network computer 114. At step S230, after receiving the authorization response message from the authorization computer processor 110, the processing network computer 114 transmits the authorization response message to the automation computer 108. Thus, the automation computer-receives an authorization response message for the transaction as a result of transmitting the authorization request message as described in step S224. At step S232, the automation computer 108 confirms that the transaction has been authenticated for further settlement purposes.

At step S234, the authorization computer 112 manages the transaction value. The authorization computer can load the virtual account received in step S222 with the transaction value received in step S214. The authorization computer 112 can anticipate the value (e.g., cash) received in step S214 to be equal to the transaction amount associated with the virtual account received in step S222. In some examples, the authorization computer 112 can be operated by an issuer who manages the received funds (i.e. transaction value) in a pool useable for settling transactions. Funds can be accumulated from multiple transactions such that the funds can be "pooled" to settle each transaction when ready for settlement. For example, $500 for the airfare transaction as described above may be added to an account controlled by the authorization computer 112. Funds from the account may be used to settle and immediately pay merchants/suppliers for one or more transactions that occur before or after the airfare transaction of $500. When the airfare transaction of $500 is ready to be settled (e.g., step S238), $500 can be removed from the account to transfer as cash value to the merchant/supplier (e.g., airline).

Prior to or after step S234, the authorization computer processor 110 may provide any authorization or other transaction details to the authorization computer 112.

At step S236, the authorization computer 112 transmits the managed virtual account and transaction value to the processing network computer 114. At step S238, upon receiving the virtual account information and corresponding transaction value, the processing network computer 114 settles the transaction. For example, the airfare loan value of $500 is settled with the authorization computer 112 and then sent to the acquirer for finalization of the settlement across all involved entities.

In examples where a single entity manages both issuer and acquirer functionality for processing a transaction, steps S240, S242, and S244 may be performed. At step S240, the processing network computer 114 causes the authorization computer 112 to transfer the transaction value from an issuer module to an acquirer module in the authorization computer 112 associated with the authorization computer processor 110. The authorization computer 112 can include any hardware and/or software (e.g., issuer module, acquirer module) to implement functionality of both an issuer and an acquirer. By performing issuer and acquirer functionality, the authorization computer 112 can avoid conventional issuer-acquirer communications and settlement processes, and instead transfer funds immediately to the account of the resource provider (e.g., a merchant/supplier such as an airline). The immediate transfer of funds can be performed using the authorization computer processor 110 working in conjunction with the authorization computer 112.

In some examples where the authorization computer processor 110 is a separate and distinct component from the authorization computer 112, the authorization computer 112 may transmit the virtual account and transactions value to the authorization computer processor 110 in step S242 to settle the transaction and immediately transfer the transaction value to the resource provider in step S244.

The processes described above allow an entity acting as both an issuer and acquirer to be subjected to minimal settlement risk because the transaction value does not leave the processing environment (see FIG. 1). A single entity acting as both issuer and acquirer can control the payment from end-to-end, including, for example, the real-time automatic funding of a small business account. The resource provider involved with a transaction purchase is not provided with the virtual account information or any related information pertaining to the virtual account. The resource provider receives the initial user information, a selection by the user for a secondary payment option (e.g., loan), and the deposited funds from the single issuer-acquirer entity. Thus, the issuer-acquirer entity maintains control over the use of the virtual account and user payment information. This allows for increased security of user payment information while reducing the amount of computation resources required by avoiding conventional issuer-acquirer settlement communications.

In some examples, some steps may be performed in any conceivable order. For example, step S234 can occur immediately following steps S214 and S222, such that the virtual account can be loaded with actual value following the authorization computer 112 receiving the transaction value and the virtual account data including the transaction amount. Additionally, these processes can occur before, after, or alongside the authentication steps as described in steps S220 through S230.

Figure 3:
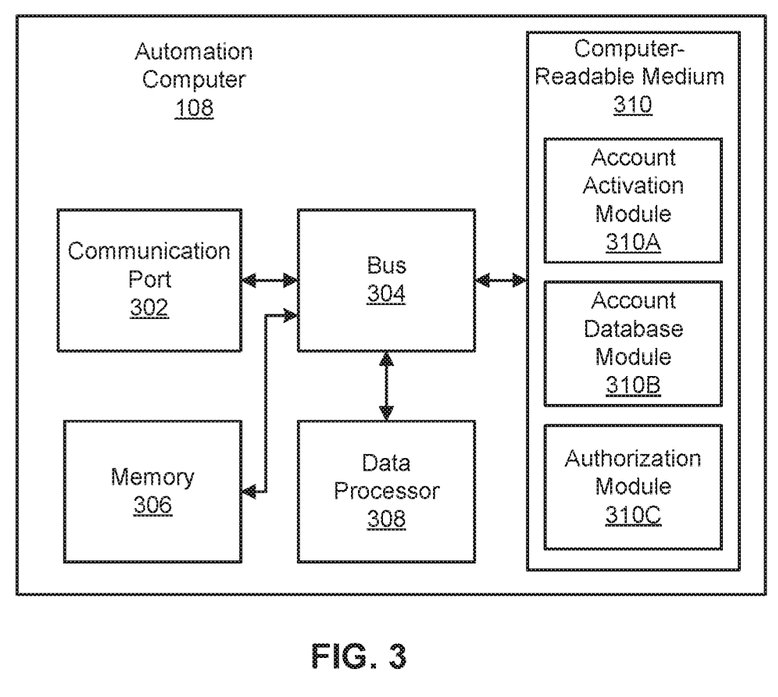
FIG. 3 illustrates an example of a block diagram of an automation computer for use in for rapid settlement of transactions using a virtual account, according to some embodiments.

FIG. 3 illustrates a block diagram of an automation computer 108 for use in for rapid settlement of transactions using a virtual account, according to one embodiment of the invention.

The automation computer 108 can include a communications port 302, a bus 304, a memory 306, a data processor 308, and a computer-readable medium 310 that are connected via the bus 304. In some examples, the components shown in FIG. 3 (e.g., the communications port 302, the bus 304, the memory 306, the data processor 308, and the computer-readable medium 310) can be integrated into a single structure. For example, the components can be within a single housing. In other examples, the components shown in FIG. 3 can be distributed (e.g., in separate housings) and in electrical communication with each other. In other examples, the database 312B can be a separate component distinct from the computer-readable medium 310 and remotely located (e.g., the database 312B stores data remotely via third-party servers, or in a Cloud-based configuration). The communications port 302 can allow the automation computer 108 to communicate with any device depicted in FIG. 1.

The data processor 308 can execute one or more operations or processes described above in relation to the automation computer 108 for implementing some examples. The data processor 308 can execute instructions stored in the memory 306 and the computer-readable medium 310 to perform the operations. The data processor 308 can include one processing device or multiple processing devices. Non-limiting examples of the data processor 308 include a Field-Programmable Gate Array ("FPGA"), an application-specific integrated circuit ("ASIC"), a microprocessor, etc.

The data processor 308 can be communicatively coupled to the memory 306 via the bus 304. The non-volatile memory 306 may include any type of memory device that retains stored information when powered off. Non-limiting examples of the memory 306 include electrically erasable and programmable read-only memory ("EEPROM"), flash memory, or any other type of non-volatile memory. In some examples, at least some of the computer-readable medium 310 can include a medium from which the data processor 308 can read instructions. A computer-readable medium can include electronic, optical, magnetic, or other storage devices capable of providing the data processor 308 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

The computer-readable medium 310 can include program code for an account activation module 310A, an account database module 310B, and an authorization module 310C. The account activation module 310A of the automation computer 108 may include any code, application, or any other software module configured to cause the automation computer 108 to generate user accounts and any corresponding information (e.g., virtual accounts). The account activation module 310A can allow the automation computer 108 to receive and interpret requests to generate virtual accounts, and to generate and transmit requests for generate virtual accounts. The account database module 310B can allow the automation computer 108 store any information corresponding to virtual accounts, virtual account generation, and requests for virtual account generation (e.g., ID numbers, PANs, etc.). The authorization module 310C can allow the automation computer 108 to generate and transmit authorization request messages, and receive and process authorization response messages.

Figure 4:
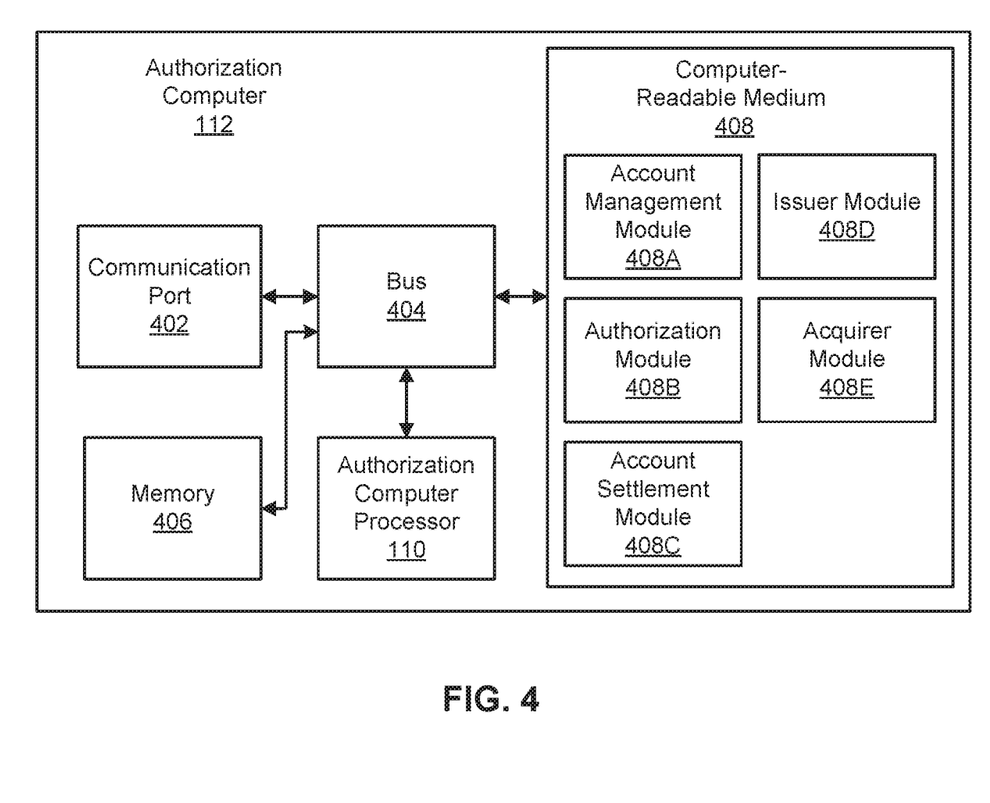
FIG. 4 illustrates an example of a block diagram of an authorization computer for use in for rapid settlement of transactions using a virtual account, according to some embodiments.

FIG. 4 illustrates a block diagram of an authorization computer 112 for use in for rapid settlement of transactions using a virtual account, according to one embodiment of the invention.

The authorization computer 112 can include a communications port 402, a bus 404, a memory 406, an authorization computer processor 110, and a computer-readable medium 410 that are connected via the bus 304. In some examples, the components shown in FIG. 4 (e.g., the communications port 402, the bus 404, the memory 406, the authorization computer processor 110, and the computer-readable medium 408) can be integrated into a single structure. For example, the components can be within a single housing. In other examples, the components shown in FIG. 4 can be distributed (e.g., in separate housings) and in electrical communication with each other. The communications port 402 can allow the authorization computer 112 to communicate with any device depicted in FIG. 1.

The authorization computer processor 110 can execute one or more operations or processes described above in relation to the authorization computer 112 for implementing some examples. The authorization computer processor 110 can execute instructions stored in the memory 406 and the computer-readable medium 408 to perform the operations. In some examples, the authorization computer processor 110 can include a computer a computer-readable medium that can comprise code executable by the authorization computer processor 110 for implementing various examples. For example, the authorization computer processor 110 can include a computer-readable medium that includes code executable by the authorization computer processor 110 to load a virtual account with a transaction amount. The authorization computer processor 110 can include one processing device or multiple processing devices. Non-limiting examples of the authorization computer processor 110 include a Field-Programmable Gate Array ("FPGA"), an application-specific integrated circuit ("ASIC"), a microprocessor, etc.

The authorization computer processor 110 can be communicatively coupled to the memory 406 via the bus 404. The non-volatile memory 406 may include any type of memory device that retains stored information when powered off. Non-limiting examples of the memory 406 include electrically erasable and programmable read-only memory ("EEPROM"), flash memory, or any other type of non-volatile memory. In some examples, at least some of the computer-readable medium 408 can include a medium from which the authorization computer processor 110 can read instructions. A computer-readable medium can include electronic, optical, magnetic, or other storage devices capable of providing the authorization computer processor 110 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

The computer-readable medium 408 can include program code for an account management module 408A, an authorization module 408B, and an account settlement module 408C. The account management module 408A of the authorization computer 112 may include any code, application, or any other software module configured to cause the authorization computer 112 to manage virtual account information, including transaction amounts and account IDs, and transactions values (e.g., loading transaction values onto corresponding virtual accounts). The account activation module 310A can allow the authorization computer 112 to receive and interpret requests to generate virtual accounts, and to generate and transmit requests for generate virtual accounts.

The authorization module 408B can allow the authorization computer 112 to receive and process authorization request messages, and generate and transmit authorization response messages. Additionally, the authorization module 408B can allow the authorization computer 112 to process information related to authentication of a transaction, and further authenticate transactions. The account settlement module 408C can allow the authorization computer 112 to perform any of the processes described above related to settling a transaction. Additionally, the computer-readable medium 408 may include an issuer module 408D for performing the functions that an issuer might perform, and an acquirer module 408E for performing functions that an acquirer might perform. Thus, settlement could occur within the authorization computer 112 in some embodiments.

Figure 5:
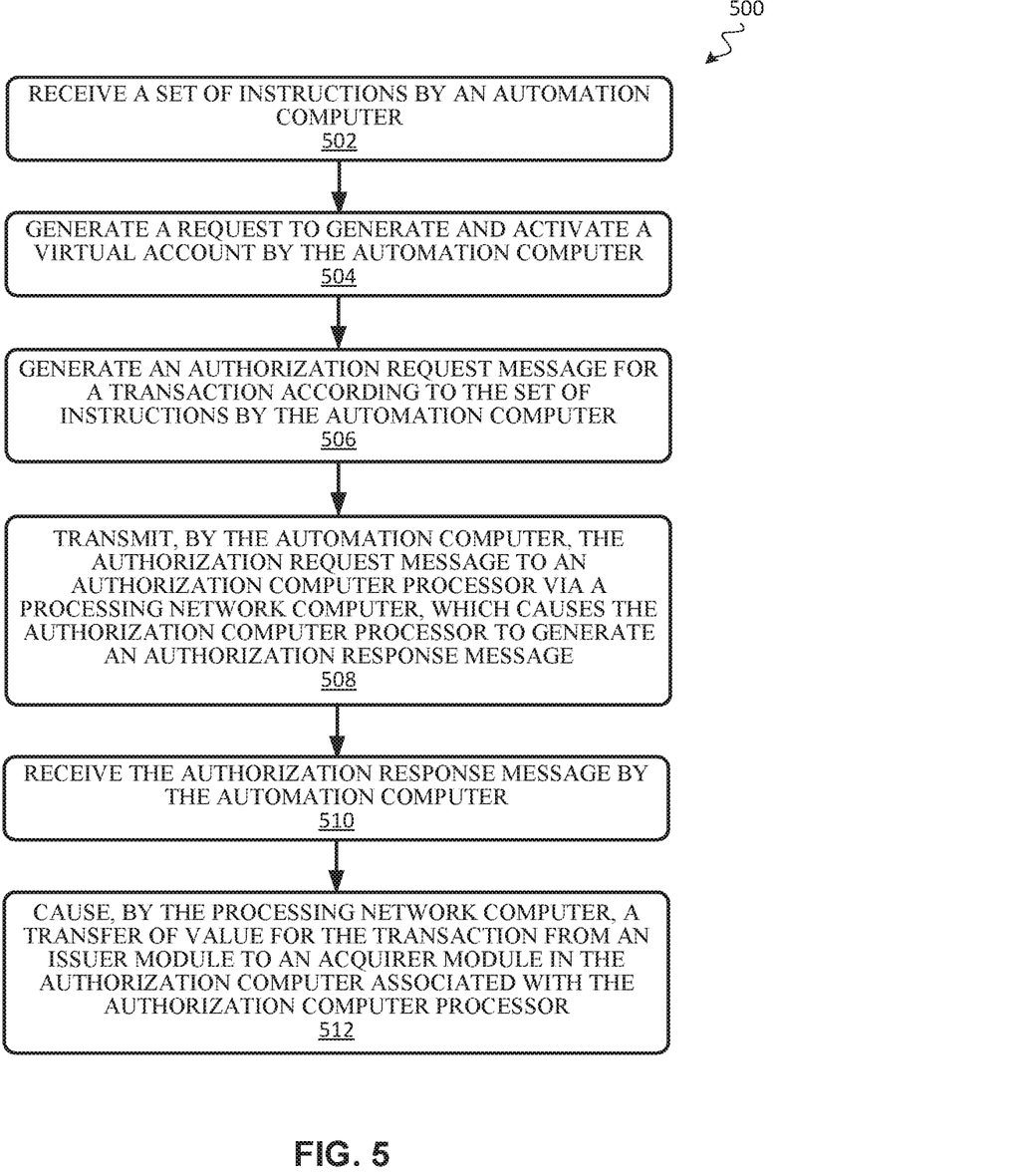
FIG. 5 illustrates an example of a flow diagram of a process for rapid settlement of transactions using a virtual account, according to some embodiments.

FIG. 5 illustrates a flow diagram of a process 500 for rapid settlement of transactions using a virtual account, according to one embodiment of the invention.

At block 502, a set of instructions is received by the automation computer. The set of instructions can include any information pertaining to a transaction initiated by a user. For example, the set of instructions can include a transaction identifier (e.g., order number), a transaction amount, user personal information, and user payment information.

At block 504, a request to generate and activate a virtual account is generated by the automation computer. The automation computer can generate a request for the generation and activation of a virtual account in response to receiving the set of instructions indicating a transaction is to be processed and settled. The request to generate and activate the virtual account can be transmitted to the authorization computer processor, which can generate and activate a virtual account for a transaction upon receipt of the request. The authorization computer processor can load the virtual account with a transaction amount, such that the virtual account is attributed with a number indicating the amount of the transaction.

At block 506, an authorization request message for a transaction is generated by the automation computer according to the set of instructions received in at block 502.

At block 508, the authorization request message is transmitted by the automation computer to an authorization computer processor indirectly through a processing network computer to cause the authorization computer processor to generate an authorization response message. The automation computer can transmit the authorization request message to the processing network computer, which can then relay the authorization request message to the authorization computer processor. The authorization computer processor, in response to receiving the authorization request message can analyze the message, authorize and authenticate the transaction based on the message, and generate then transmit an authorization response message to the processing network computer.

At block 510, the authorization response message is received by the automation computer. After receiving the authorization response message from the authorization computer processor, the processing network computer can relay the authorization response message to the automation computer. Upon receipt of the authorization response message, the automation computer can finalize authorization of the transaction.

At block 512, the processing network computer causes a transfer of value for the transaction from an issuer module to an acquirer module in the authorization computer associated with the authorization computer processor. The authorization computer processor can be in communication with the issuer module and the acquirer module such that the authorization computer can perform functions of both an issuer and an acquirer. Thus, the authorization computer can transfer value corresponding to the transaction from one module to another without external communication or communication regarding the transaction with an external entity. The transfer of value can be equal to the transaction amount associated with the virtual account.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

What is claimed is:

1. A method comprising:
   receiving, by an automation computer from a resource provider computer operated by a resource provider, a set of instructions including transaction information for a transaction between the resource provider and a user;
   generating, by the automation computer, a request to generate and activate a virtual account associated with the transaction;
   generating, by an authorization computer processor in response to the request, the virtual account;
   activating, by the authorization computer processor in response to the request, the virtual account;
   generating, by the automation computer, an authorization request message for the transaction according to the set of instructions;
   transmitting, by the automation computer, the authorization request message to the authorization computer processor via a processing network computer;
   generating, by the authorization computer processor in response to the authorization request message, an authorization response message;
   receiving, by the automation computer, the authorization response message;
   clearing, by an authorization computer, the transaction; and
   transferring, by the authorization computer, a value for the transaction from an issuer module to an acquirer module in the authorization computer.

2. The method of claim 1, wherein the virtual account is a prepaid account.

3. The method of claim 1, further comprising: loading, by the authorization computer processor, the virtual account with a transaction amount.

4. The method of claim 3, wherein the transfer of value is equal to the transaction amount.

5. The method of claim 1, wherein the set of instructions includes a transaction identifier associated with the virtual account.

6. A system comprising:
   an automation computer comprising a first processor, and a first computer-readable non-transitory memory, the first computer-readable non-transitory memory comprising code executable by the first processor which causes the first processor to perform the steps of:
   receiving, by the automation computer from a resource provider computer operated by a resource provider, a set of instructions including transaction information for a transaction between the resource provider and a user;

generating, by the automation computer, a request to generate and activate a virtual account associated with the transaction;

generating, by the automation computer, an authorization request message for the transaction according to the set of instructions;

transmitting, by the automation computer, the authorization request message to an authorization computer processor via a processing networkcomputer; and receiving, by the automation computer from the authorization computer processor via the processing network computer, an authorization response message;

the authorization computer processor, in operative communication with the automation computer, comprising a second computer-readable non-transitory memory and a second processor, the second computer-readable non-transitory memory comprising code executable by the authorization computer processor which causes the second processor to perform the steps of:

generating, by the authorization computer processor in response to the request, the virtual account; and activating, by the authorization computer processor in response to the request, the virtual account; and an authorization computer, in operative communication with the automation computer, comprising a third processor and a third computer-readable non-transitory memory, the third computer-readable non-transitory memory comprising code executable by the third processor which causes the third processor to perform the steps of:

clearing, by the authorization computer, the transaction; and transferring, by the authorization computer, a value for the transaction from an issuer module to an acquirer module in the authorization computer.

7. The system of claim 6, wherein the virtual account is a prepaid account.

8. The system of claim 6, the steps performed by the authorization computer processor further comprising:
loading the virtual account with a transaction amount.

9. The system of claim 8, wherein the transfer of value is equal to the transaction amount.

10. The system of claim 6, wherein the processing network computer is in a payment processing network.

11. The system of claim 6, wherein the set of instructions includes a transaction identifier associated with the virtual account.

12. The method of claim 1, wherein the authorization computer processor is a component of the authorization computer.

13. The method of claim 1, further comprising:
transmitting, by the authorization computer processor, the virtual account or identifier thereof to the authorization computer.

* * * * *

UNITED STATES PATENT AND TRADEMARK OFFICE
CERTIFICATE OF CORRECTION

| | |
|---|---|
| PATENT NO. | : 11,250,393 B2 |
| APPLICATION NO. | : 16/186156 |
| DATED | : February 15, 2022 |
| INVENTOR(S) | : Chris Truelson and Leigh Radtke |

It is certified that error appears in the above-identified patent and that said Letters Patent is hereby corrected as shown below:

In the Claims

In Column 16, Line 48 please replace "w herein" with -- wherein --

In Column 16, Line 53 please replace "w herein" with -- wherein --

In Column 17, Line 9 please replace "networkcomputer;" with -- network computer --

Signed and Sealed this
Thirtieth Day of August, 2022

Katherine Kelly Vidal
*Director of the United States Patent and Trademark Office*